United States Patent
Ito et al.

(10) Patent No.: US 9,760,463 B2
(45) Date of Patent: Sep. 12, 2017

(54) MICROCONTROLLER FAULT INJECTION METHOD AND SYSTEM

(71) Applicant: Hitachi, Ltd., Chiyoda-ku, Tokyo (JP)

(72) Inventors: Yasuhiro Ito, Tokyo (JP); Yasuo Sugure, Tokyo (JP)

(73) Assignee: HITACHI, LTD., Tokyo (JP)

( * ) Notice: Subject to any disclaimer, the term of this patent is extended or adjusted under 35 U.S.C. 154(b) by 17 days.

(21) Appl. No.: 14/890,200

(22) PCT Filed: Jun. 6, 2013

(86) PCT No.: PCT/JP2013/065706
§ 371 (c)(1),
(2) Date: Nov. 10, 2015

(87) PCT Pub. No.: WO2014/196059
PCT Pub. Date: Dec. 11, 2014

(65) Prior Publication Data
US 2016/0110274 A1     Apr. 21, 2016

(51) Int. Cl.
| | | |
|---|---|---|
| G06F 11/00 | (2006.01) | |
| G06F 11/263 | (2006.01) | |
| G06F 11/22 | (2006.01) | |
| G06F 11/26 | (2006.01) | |

(52) U.S. Cl.
CPC ............ *G06F 11/263* (2013.01); *G06F 11/22* (2013.01); *G06F 11/2236* (2013.01); *G06F 11/26* (2013.01); *G06F 11/261* (2013.01)

(58) Field of Classification Search
CPC ... G06F 11/261; G06F 11/263; G06F 11/2236
USPC ............................................. 714/41
See application file for complete search history.

(56) References Cited

U.S. PATENT DOCUMENTS

| | | | | |
|---|---|---|---|---|
| 7,284,159 | B2 * | 10/2007 | Chakraborty .. | G01B 31/318541 714/32 |
| 7,426,662 | B2 * | 9/2008 | Sekiguchi ........... | G06F 11/0748 714/43 |
| 8,051,346 | B2 * | 11/2011 | Somasundaram | G01R 31/31706 324/512 |
| 8,621,281 | B2 * | 12/2013 | Kan .................... | G06F 9/30105 714/25 |
| 2004/0153794 | A1 | 8/2004 | Velazco et al. | |
| 2006/0271825 | A1 * | 11/2006 | Keaffaber ........... | G06F 11/3688 714/38.13 |
| 2008/0155328 | A1 * | 6/2008 | Chakraborty ....... | G06F 11/3672 714/32 |

(Continued)

OTHER PUBLICATIONS

PCT International Search Report on application PCT/JP2013/065706 mailed Aug. 20, 2013; 5 pages.

*Primary Examiner* — Elmira Mehrmanesh
(74) *Attorney, Agent, or Firm* — Foley & Lardner LLP

(57) ABSTRACT

Temporary fault injection to existing hardware is performed using only software without changing an implementation of the hardware. A fault injection interrupt process starts on an operation of a CPU using an interrupt that is not used by software, and an internal state of hardware is updated to the same value as a result obtained when a fault has occurred during the interrupt process. A clock of the CPU during the interrupt process is accelerated so that a period of time of the interrupt process is smaller than a period of time until a fault becomes effective.

7 Claims, 10 Drawing Sheets

(56) References Cited

U.S. PATENT DOCUMENTS

| | | | |
|---|---|---|---|
| 2009/0240986 A1* | 9/2009 | Warren | G06F 11/263 714/32 |
| 2012/0123764 A1* | 5/2012 | Ito | G06F 11/3664 703/21 |
| 2014/0173361 A1* | 6/2014 | Meaney | G06F 11/004 714/47.2 |

* cited by examiner

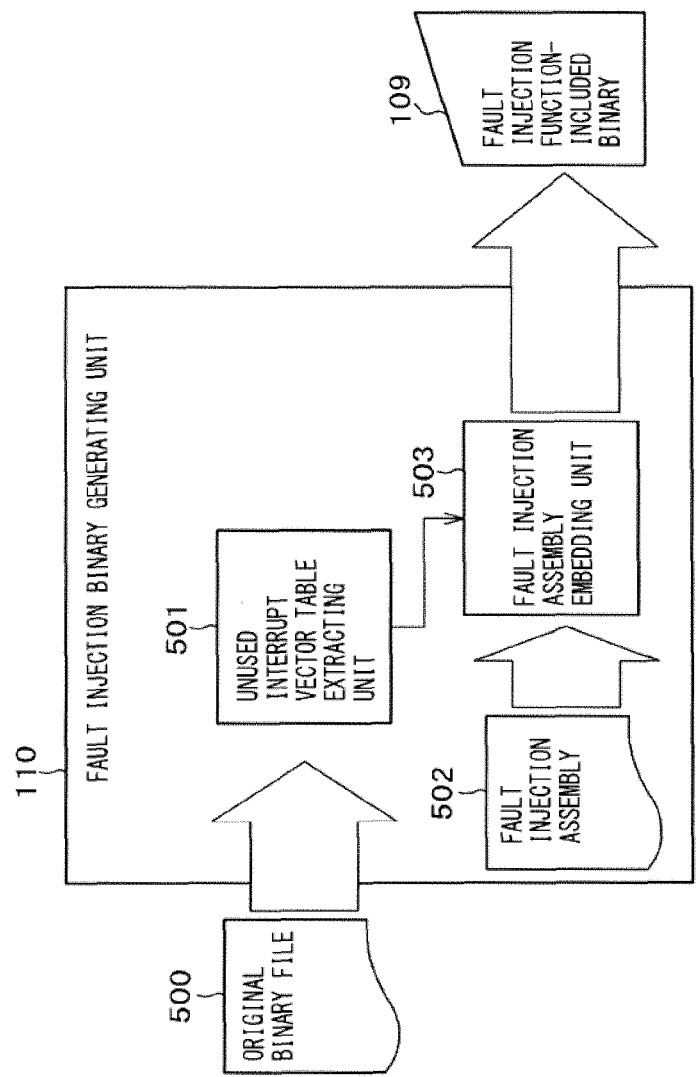
F I G . 5

MICROCONTROLLER FAULT INJECTION METHOD AND SYSTEM

TECHNICAL FIELD

The present invention relates to an embedded system verification method and system, and more particularly, to a cooperation simulator or an evaluation hardware technique which is appropriate to development of an embedded system configured with a mechanism (serving as an electronic control target), hardware, (an electronic control system), and software (a program).

BACKGROUND ART

An embedded system refers to a system configured with a mechanism configuring a control target, hardware that performs a control operation based on a physical quantity received from the mechanism, and outputs a controls value to the mechanism, and software operating on the hardware.

For example, an embedded system for an automotive engine control is configured with a mechanism such as an engine serving as a control target, an electronic device such as a microcontroller that performs a control operation and controls the engine or the like, and software operating on the microcontroller or the like.

Behavior of the software included in the embedded system strongly depends on configurations of the mechanism serving as the control target and the hardware, and thus it is necessary to perform behavior analysis in light of all of the mechanism, the hardware, and the software.

In recent years, as automobiles, electrical equipment, and the like pursue high and high functionality, an embedded system has been more complicated, and in order to reduce a work period of time, parts of hardware, and software are segmented, division of labor is performed, and simultaneous development is performed at multiple locations.

When the division of labor progresses, deficiency in performance or nonconformity of a specification which is found at the time of operation check of each part of assembly of a part increases, and a development period of time is frequently delayed due to return at the final state before a product is shipped, leading to a problem of deterioration in development efficiency.

In order to solve this problem, a performance evaluation verification technique based on a simulation in which a mechanism, hardware, and software are in collaboration at the time of design began to be used.

When performance evaluation and operation verification are performed through the simulation, it is necessary to describe operations of elements configuring a target embedded system to be software executable on a simulator as a simulation model.

In a common form, the simulation model is provided from a company or a department that is in charge of design and manufacture of elements of each of a mechanism and hardware.

System operation verification in which fault injection of a hardware part is considered is expected in such a simulation-based software verification process.

To this verification, in the related art, it is necessary to cause actual hardware to have a fault. However, since it is not possible to incur a fault desired by a user at an arbitrary position at an arbitrary timing, choices of verification that can be applied are very limited.

On the other hand, in the case of the simulation-based technique, fault injection to an arbitrary position is theoretically possible by modeling a desired fault.

In this regard, fault injection to a connection between parts of an electronic system is performed, for example, using a technique disclosed in Patent Document 1.

CITATION LIST

Patent Document

Patent Document 1: US 2004-153794 A

SUMMARY OF THE INVENTION

Problems to be Solved by the Invention

In future, reliability of electronic system devices is assumed to be further lower with the size reduction of semiconductors, and the demands of a fault injection test in parts are considered to increase.

When an influence evaluation of a fault that is very low in an occurrence probability is performed, in order to reduce a verification period of time, changing a structure of hardware according to a fault that is desired to be injected is reviewed.

However, since the hardware part or the simulation model is commonly provided from a company or a department separate from the user as described above, and it is difficult for a manufacturer to change an implementation for each user, an operation test in which a fault is considered has not been performed on systems other than, for example, an aeronautical system or an satellite system which is hardly repaired when a fault occurs. However, it is desirable that such an operation test be performed even on consumer products due to the enactment of strict safety standards and the size reduction of hardware.

In the technique disclosed in Patent Document 1, values of a memory, a PC, and the like are loaded onto a register in an interrupt process, and then an bit operation of simulating a bit error is performed together. However, in the above technique, when it is processed in an interrupt, a delay unnecessarily occurs as a period of time in which a fault is injected, it is difficult to evaluate an execution period of time accurately, and it is necessary to review a decrease in accuracy of simulation and further review how to control an interrupt timing.

Due to the above reason, high efficiency of a software operation test in which a detailed malfunction influence is considered has become an issue.

Solutions to Problems

According to the present invention, the above problem is solved by simulating a change in an internal state caused by a temporary malfunction of hardware using only software.

In most CPUs including an embedded control microcontroller, a function of interrupting normal program execution and preferentially performing a predetermined process is implemented. In the present invention, this interrupt function is used. The user implements a program of rewriting an internal state corresponding to a hardware malfunction that is desired to be simulated in a form in which it is added to software to be tested in advance. Further, an interrupt channel which has not been used by a function originally provided in this software is allocated to trigger the added software.

The software is executed on the simulator or evaluation hardware, and the fault injection interrupt process is triggered at a time stamp at which the user injects a fault using a software interrupt or an external interrupt.

In other words, in the past, the entire procession operation is stopped, and the internal state is rewritten from an external measurement device, whereas in the present invention, clock acceleration (device/model) synchronized with a software interrupt in which a target portion to be rewritten is temporarily clock-accelerated and a state is rewritten from the inside of the software is used.

As a result, from a point of view of original software during execution, the internal state of the hardware is recognized to have been changed due to a malfunction.

If an execution period of time of the fault injection interrupt process is longer than an actual malfunction period of time, a clock frequency of target hardware is accelerated during the fault injection interrupt process, and the execution period of time of the fault injection interrupt process is adjusted not to be problematic.

Effects of the Invention

According to the present invention, the user need not change an implementation or each model or each evaluation hardware, and when a desired fault occurs, influence analysis can be emulated only using software, and it contributes to an improvement in productivity of a system test in which influence of an arbitrary temporary hardware malfunction is evaluated.

BRIEF DESCRIPTION OF THE DRAWINGS

FIG. 5 is a diagram illustrating a configuration of a fault injection binary generating unit according to the first embodiment.

MODE FOR CARRYING OUT THE INVENTION

Figure 2:
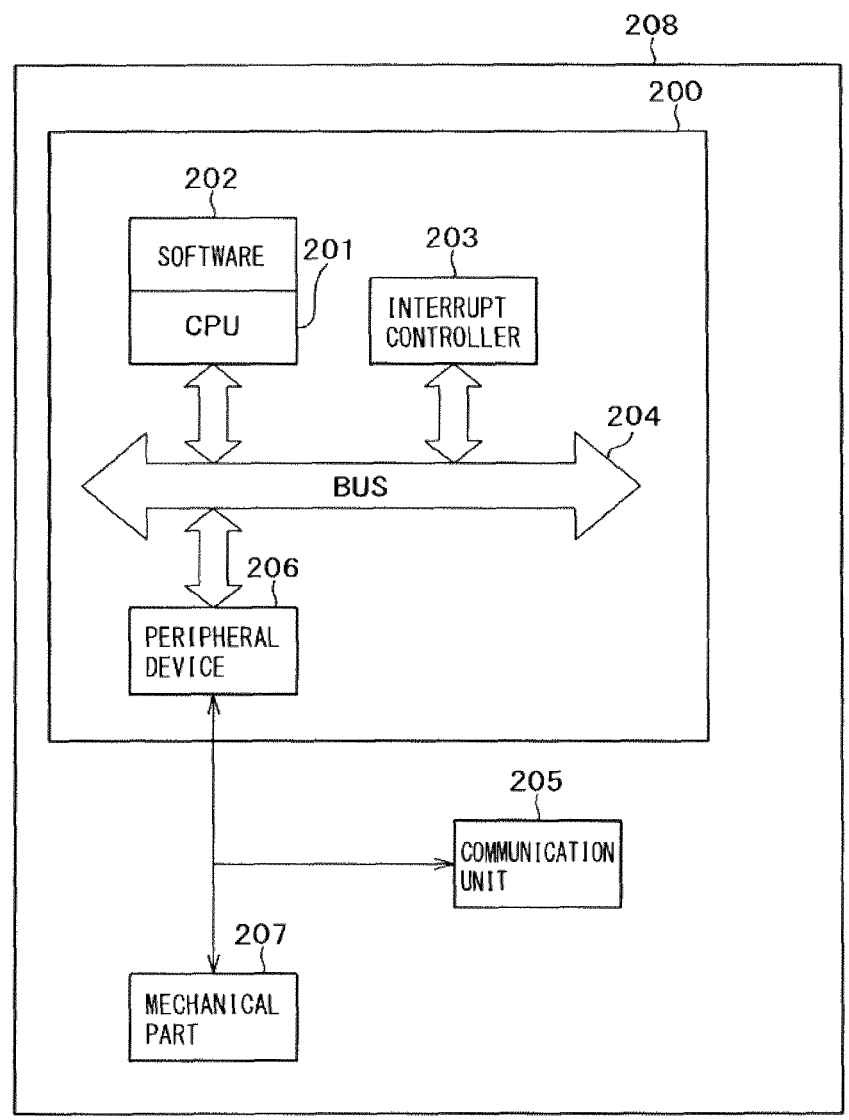
FIG. 2 is a diagram illustrating an embedded system configuration.

FIG. 2 illustrates an overview of an embedded system 200 serving as an application target of the present invention.

Commonly, the embedded system is configured with a combination of a mechanical part 207, a communication unit 205 for performing communication with the outside, and a control microcontroller 200.

Inside the control microcontroller 200, there is a CPU 201 centering on a bus 204, and software 202 operates on the CPU 201.

An interrupt controller 203 is connected with the CPU 201, and a peripheral device 206 is connected with the mechanical part 207 and the communication unit 205 which are arranged outside the control microcontroller 200.

When the embedded system 208 operates, the flow of data has a form in which when the peripheral device 206 receives data from the communication unit 205 or the mechanical part 207, the interrupt controller 203 interrupts data processing on the CPU 201, a processing result passes through the peripheral device 206, and a command is given to the communication unit 205 or the mechanical part 207.

Figure 1:
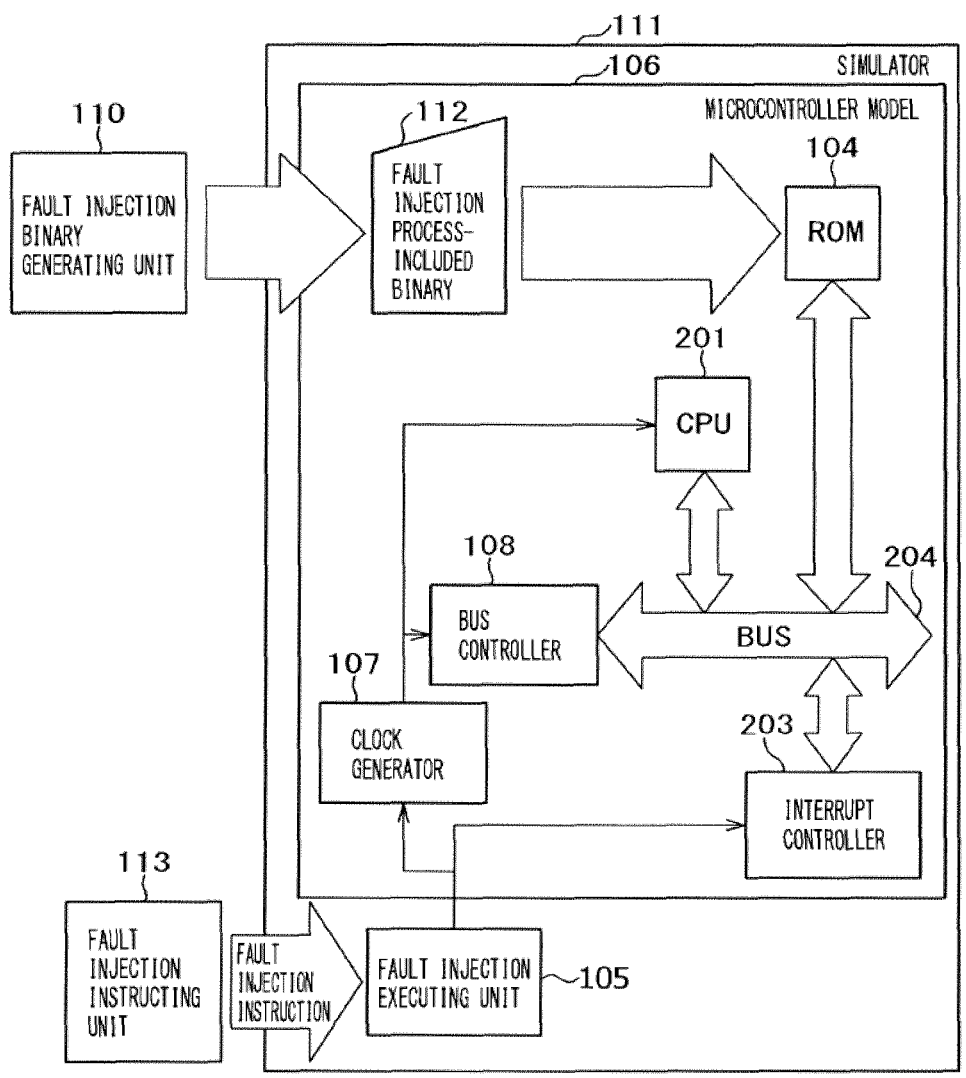
FIG. 1 is a diagram illustrating an overall configuration of a first embodiment.
Figure 3:
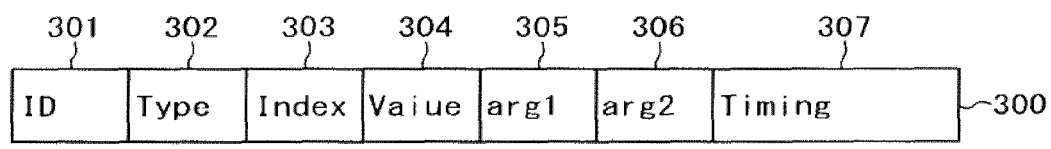
FIG. 3 is a diagram illustrating data arrangement definition of a simulator manipulation common protocol.

FIG. 3 illustrates an exemplary configuration of a common protocol 300 of the present system that is exchanged between a fault injection instructing unit 113 and a fault injection executing unit 105 illustrated in FIG. 1. The present protocol may include a variable length instruction sequence.

In FIG. 3, an arg1 field 305 and an arg2 field 306 are portions having a variable length, and the number thereof is controlled by an Index 303. The remaining fields are fixed. An ID field 301 indicates a test item of the fault injection executing unit 105 including one or more test items which is to be executed. A Type field 302 designates a type of test item. When a test item is an observation trigger event, an execution result of the item is input to a Value field 304. A simulation time at which a test item is executed is described in a Timing field 307, and the Timing field 307 is transmitted from the fault injection instructing unit 113 and returned in a state in which a simulation time at which a simulation was actually executed by the fault injection executing unit 105 is overwritten.

The protocol 300 is implemented to have compatibility with a library for manipulating another simulator and thus can execute a fault injection in collaboration with a plurality of simulators. For example, the fault injection may be performed when the state of the mechanical part 207 of FIG. 2 is changed.

First Embodiment

An exemplary configuration of the present embodiment for implementing the fault injection to an internal component of the microcontroller using the simulator will be described.

A configuration of the present embodiment will be described with reference to FIG. 1.

In the present system, while a simulator 111 capable of performing a microcontroller operation simulation is operating, the fault injection instructing unit 113 gives a fault injection instruction from the outside of the simulator. To this end, in the simulator, the fault injection executing unit 105 that receives the fault injection instruction and triggers execution of a fault injection operation is connected with a microcontroller model 106 serving as a verification target. Further, target software operating on the microcontroller model 106 is read before the simulation is executed, but a fault injection process-included binary 112 is generated by a fault injection binary generating unit 110 before the simulation starts. The "binary" refers to a program having an executable format. An internal structure of the microcontroller model 106 depends on an electronic system part serving as a target, but the CPU 201, a ROM 104, the bus 204, the interrupt controller 203, a clock generator 107, and a bus controller 108 are mandatory for implementation of the present embodiment.

Here, an overview of a fault injection interrupt process executed by the system configuration of FIG. 1 will be described.

(1) For the fault injection interrupt process, a clock is accelerated.

(2) A register value from a CPU is saved in a save area.

(3) A designated register internal state is destroyed (erased).

(4) A saved register value is written back into the CPU.

(5) An original velocity of a clock is restored.

Further, in the present embodiment, since the above process ends within an original clock period of time, the process looks to have been abruptly changed in terms of software, but a temporal adverse effect occurring in software simulation can be removed by clock acceleration.

Figure 4:
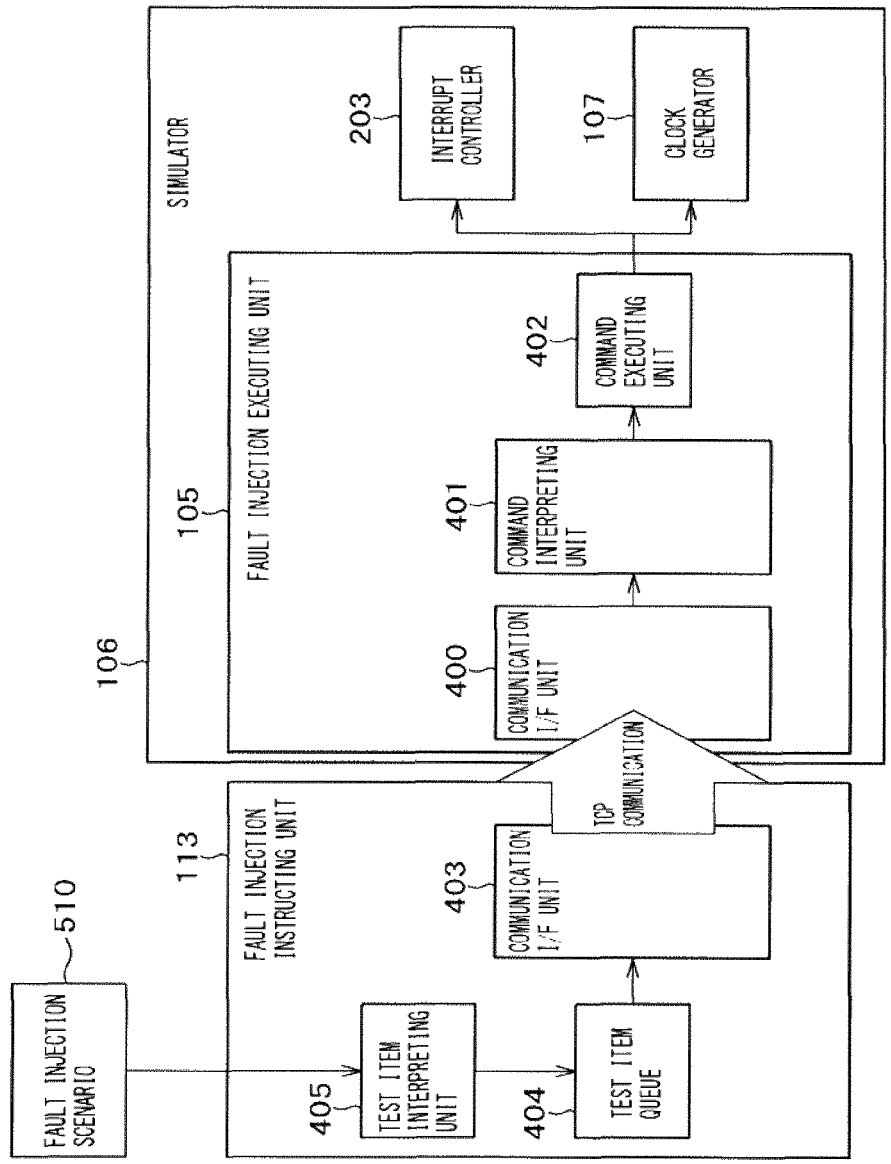
FIG. 4 is a diagram illustrating detailed configurations and a connection method of a fault injection instructing unit and a fault injection executing unit.

A connection relation between the fault injection executing unit 105 and the configuration of the fault injection instructing unit 113 will be described with reference to FIG. 4.

The fault injection instructing unit 113 is configured with the following three components.

The fault injection instructing unit 113 is configured with a test item interpreting unit 405 that receives a test item document (a "fault injection scenario" of step 702 of FIG. 7 which will be described later) input by the user, and interprets the fault injection instruction of the present invention described therein, a test item queue 404 that holds the interpreted fault injection instruction and stores the fault injection instruction until the fault injection instruction is sequentially used, and a communication I/F unit 403 that transmits the fault injection instruction to the fault injection executing unit 105.

The fault injection executing unit 105 connected with the fault injection instructing unit 113 through TCP communication, and can transmit information indicating a fault injection interrupt process which is designated to be executed and information indicating a time stamp in which the fault injection interrupt process has been executed to the fault injection instructing unit 113 using the common protocol as illustrated in FIG. 3.

The fault injection executing unit 105 is configured with a communication I/F unit 400 holding an interface for receiving the fault injection instruction from the fault injection instructing unit 113, a command interpreting unit 401 that interprets a received command and obtains a fault injection timing and a fault injection interrupt process of a target, and a command executing unit 402 that is connected to the microcontroller model 106 serving as an actual target, and starts an interrupt or manipulates a clock frequency.

The interrupt controller 203 and the clock generator 107 are connected with the command executing unit 402 of the fault injection executing unit 105, and thus the fault injection executing unit 105 can perform a manipulation or operation state transfer.

The clock generator 107 connected with the fault injection executing unit 105 distributes a clock signal to the bus controller 108 of the bus 204 and the CPU 201.

The fault injection executing unit 105 activates the interrupt controller 203 according to the fault injection instruction of the fault injection instructing unit 113, and sets an output frequency of the clock generator 107 while triggering the interrupt process. In the setting of the clock frequency, the user appropriately sets a value that does not influence the simulation operation.

When the end of the interrupt process is transferred to the fault injection executing unit 105 through the interrupt controller 203, a previously set value is written back from a high value to a low value (an original clock value) as the output frequency of the clock generator 107.

Figure 6:
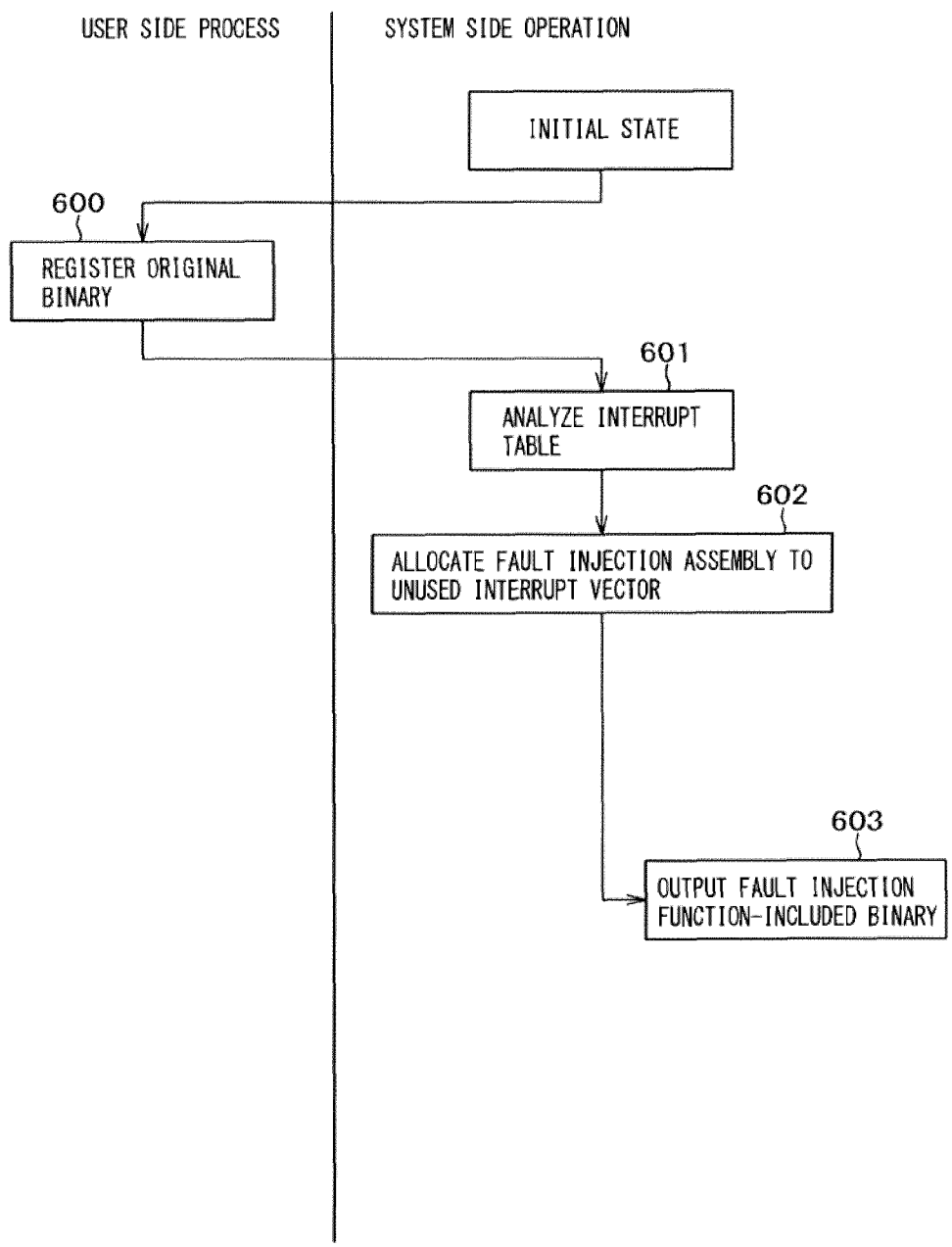
FIG. 6 is a diagram illustrating a fault injection binary generation flow according to the first embodiment.

FIG. 5 illustrates a configuration of the fault injection binary generating unit 110 used in the first embodiment, and FIG. 6 illustrates the flow of generating a fault injection function-included binary 109 through the fault injection binary generating unit 110.

This part receives two files, that is, an original binary file 500 and a fault injection assembly 502, and outputs the fault injection function-included binary 109 used in a fault injection simulation.

When the fault injection binary generating unit 110 starts an operation, first, the user is requested to register software that is desired to be verified, that is, the original binary file 500. (Step 600) An unused interrupt vector table extracting unit 501 analyzes an interrupt table of the input original binary file 500, and extracts an interrupt vector to which a process is not allocated. (Step 601) A fault injection assembly embedding unit 503 combines one or more fault injection assemblies 502 with a bit operation equivalent to a fault mode desired by the user, and generates a fault injection interrupt process.

Further, the fault injection interrupt process is allocated to the unused interrupt vector extracted in step 601. (Step 602) A binary file in which this allocation is added to the original binary file 500 is output as the fault injection function-included binary 109. (Step 603) A process of triggering the interrupt process is not included in the fault injection function-included binary 109. Thus, since the fault injection function is not performed without an interrupt manipulation performed by the fault injection execution unit 105, the same behavior as in the original binary file 500 is shown even when the interrupt process is performed by a simulator or actual equipment to which the present embodiment is not applied. In other words, the fault injection does not influence the operation of the original binary file 500.

Figure 7:
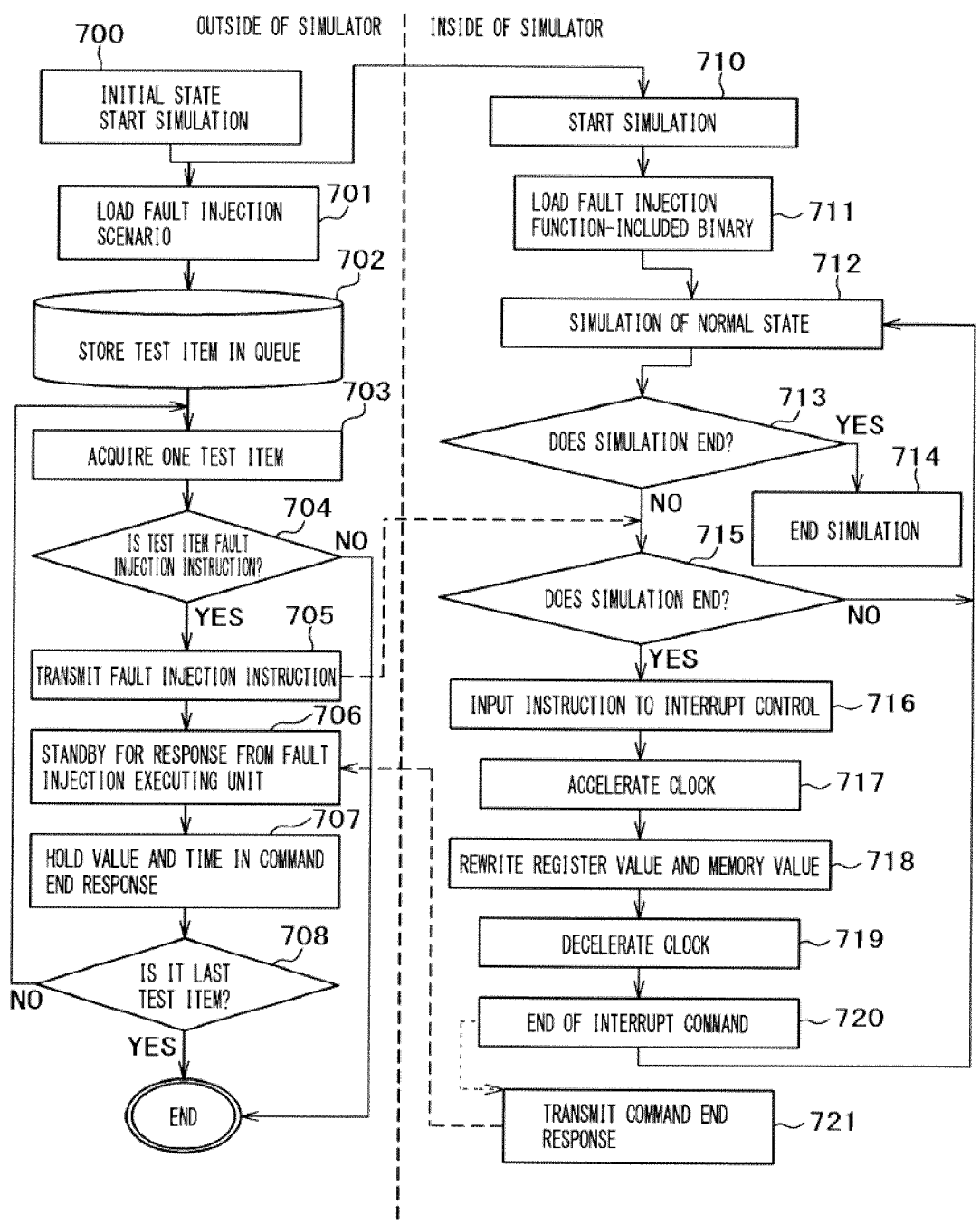
FIG. 7 is a diagram illustrating a system operation flow according to the first embodiment.

FIG. 7 illustrates an overall simulation execution flow according to the first embodiment of the present invention. In FIG. 7, broken line arrows indicate information that is transmitted and received between the outside of the simulator and the inside of the simulator.

When the user selects the start of the simulation, both the outside of the simulator and the inside of the simulator start a fault injection execution preparation at the same time (step 700). In the outside of the simulator, first, a fault injection scenario 510 desired by the user is loaded. The fault injection scenario 510 is a file in which a list of a time and a place at which fault injection is performed is described. The test item interpreting unit 405 of the fault injection instructing unit 113 receives and interprets this file. (Step 701) A test item obtained in the previous step (step 701) is stored in the test item queue 404 (step 702). The test item is acquired from the test item queue 404 at the previous stage one by one in the descending order of priorities of the test items (step 703), and when the test item is the fault injection instruction using the present invention (step 704), the test item is transmitted from the fault injection instructing unit 113 to the fault injection executing unit 105 (step 705). In the other cases, the test item undergoes a predetermined process or is discarded. In other words, when "No" is determined in step 704, the process ends (709).

After step 705, the internal process of the simulator ends, and an operation of waiting for a response from the fault injection executing unit is performed (step 706). (Steps 707 and 708 will be described later). At this point in time, in the inside of the simulator, it is necessary to proceed up to the start of the simulation process (step 710).

The simulator loads the fault injection function-included binary 109, and a software execution simulation starts on the simulator (step 711). Further, while the simulation of the normal state is continuously being performed (step S712), when the simulation reaches the final state by a request from the user or a problem on the system (step 713), the simulation ends (step 714). In the other cases, the simulation of the normal state is continued until there is an intervention from the outside of the simulator (step 712).

When the communication I/F unit 400 of the fault injection executing unit 105 receives the fault injection instruction transmitted from the fault injection instructing unit 113 (the outside of the simulator) in step 705 (step 715), the command interpreting unit 401 interprets the received fault injection instruction, and obtains the interrupt vector designation to which a fault to be injected is allocated and a time stamp at which the fault injection is executed.

The command executing unit 402 is on standby until the simulation time comes based on the time stamp, that is, until the time stamp, and then inputs an interrupt signal corresponding to the selected interrupt vector to the interrupt controller 203 (step 716).

At the same time as the previous step (step 716), the command executing unit 0402 accelerates the clock signal through the clock generator 107 (step 717).

In this state, the software execution on the CPU 201 is interrupted. At this time, content of a register in the CPU or a special register of a PC, an SP, or the like, is also written in a memory through a context switch function (a process of holding and reconstructing a state (context) of the CPU so that one CPU is shared by a plurality of processes). On the other hand, an operation of rewriting a value selected inside an interrupt handler, that is, a value when a fault to be injected occurs is performed. Further, an operation of observing and rewriting the internal state of the microcontroller is performed by writing back the memory value in the register or the like using the context switch function of the interrupt (step 718).

At this time, a value of a clock to be accelerated is set so that a sum of periods of time when the fault injection is executed is smaller than a period of one clock (a normal clock counter). As a result, a delay time of the fault injection operation can be regarded as 0.

When the interrupt process of the previous step (step 718) ends, and then a signal is transmitted from the CPU 201 to the interrupt controller 203, the command executing unit 0402 reads the signal, ends the clock acceleration, and restores the original clock frequency (steps 719 and 720).

When the interrupt process ends and the signal is not transmitted from the CPU 201 to the interrupt controller 203, it is necessary to add a command for lowering the clock frequency in each interrupt process of the fault injection process-included binary 112. At this time, it is necessary to connect the clock generator 107 to the bus 204 and perform an implementation so that a multiplication rate of the clock can be manipulated from software.

Upon detecting the end of the interrupt process (step 720), the command executing unit 0402 reads the time stamp at which the interrupt has actually ended or the designated register value, generates a command end response using the format illustrated in FIG. 3, and transmits the command end response to the fault injection instructing unit 113 (step 721).

The fault injection instructing unit 113 holds content of the transmitted command end response, and the execution of one fault injection instruction is consequently completed (step 707).

When the command in which the execution has ended is the last element of the test item queue 404, the simulation ends. Otherwise, the simulation is continued, the process returns to step 703, and a next test item is processed (708).

Second Embodiment

Figure 9:
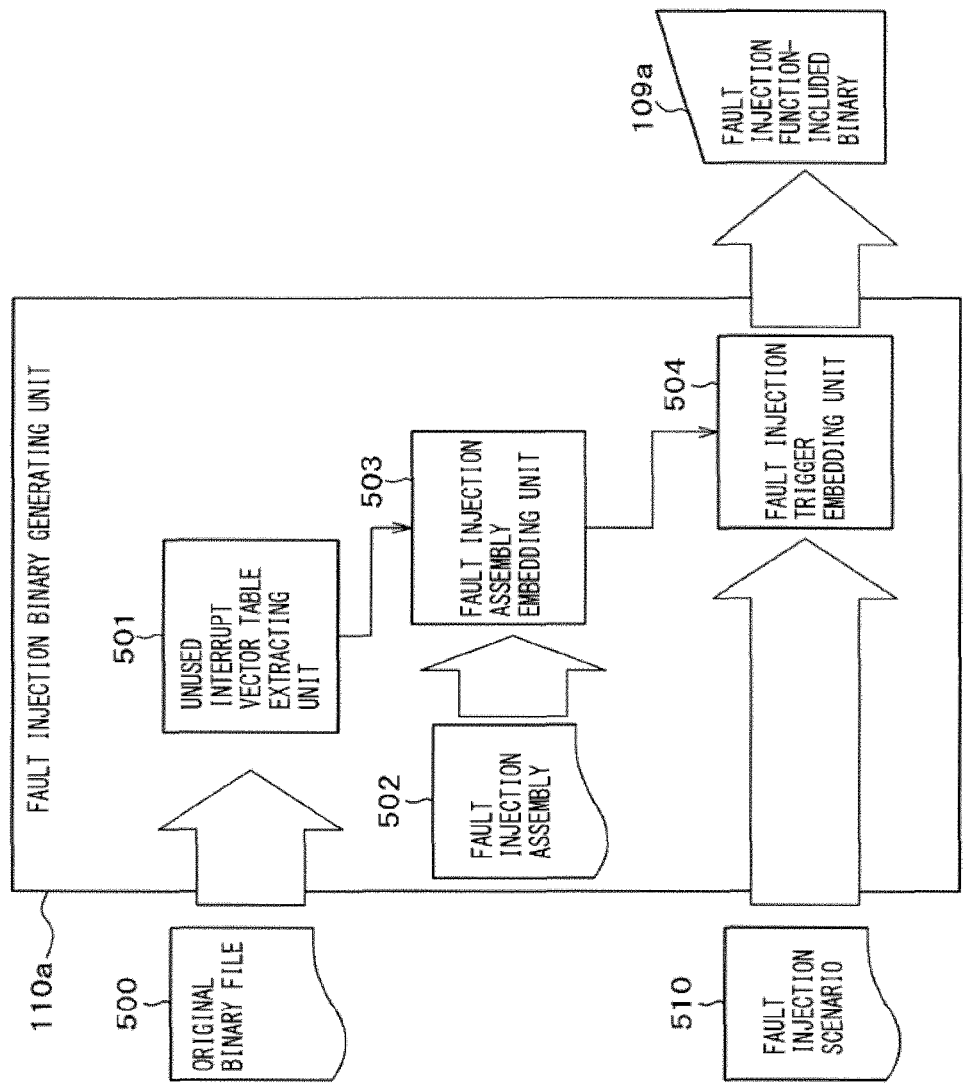
FIG. 9 is a diagram illustrating a configuration of a fault injection binary generating unit according to the second embodiment.

The second embodiment relates to an exemplary configuration when the same functions as in the invention of the first embodiment are implemented by only software. In other words, in the first embodiment, as illustrated in FIG. 1, the fault injection is performed on the hardware of the clock generator 107 and the interrupt controller 203 through the fault injection instructing unit 113 and the fault injection executing unit 105, whereas in the second embodiment, one of features lies in that a processing unit for putting fault injection (a fault injection trigger embedding unit 504) into a fault injection binary generating unit 110a as illustrated in FIG. 9 which will be described later.

Since it is necessary to alter only components on software and the microcontroller, in the second embodiment, an operation on an actual microcontroller is also possible.

Figure 8:
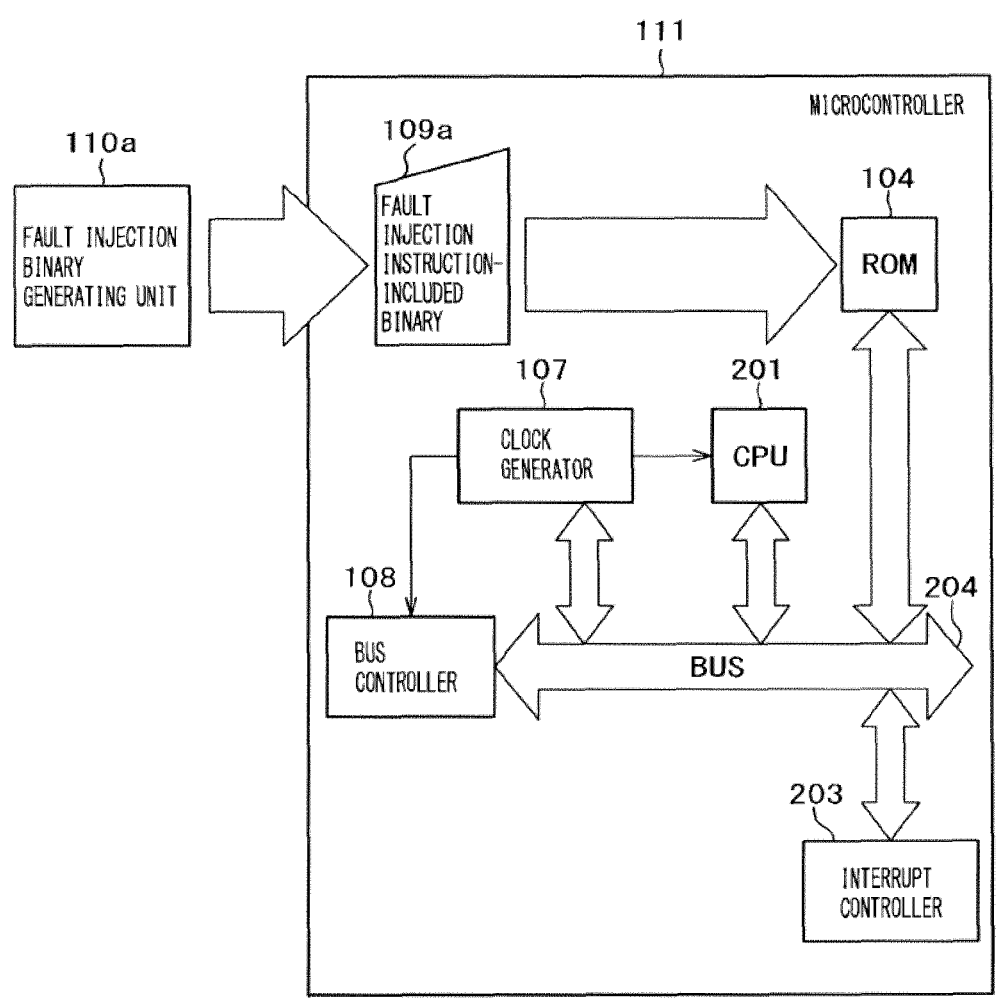
FIG. 8 is a diagram illustrating an overall configuration of a second embodiment.

A configuration in which an embodiment is implemented by only software will be described with reference to FIG. 8.

In the present system, the microcontroller model 106 operates on the simulator 111 that can perform a microcontroller operation simulation. A fault injection instruction-included binary 109a operating on the microcontroller model 106 is a binary in which an software interrupt is inserted into the fault injection function-included binary 112 used in the first embodiment at a timing at which the user desires to perform the fault injection. This binary is generated by the fault injection binary generating unit 110a before the simulation starts.

An internal structure of the microcontroller model 106 depends on an electronic system part serving as a target, but the CPU file 201, the ROM 104, the bus 204, the interrupt controller 203, the clock generator 107, and the bus controller 108 are mandatory for implementation of the present embodiment.

Further, in the present embodiment, it is necessary to connect the clock generator 107 to the bus 204 and have a structure a multiplication rate of the clock signal output from the clock generator 107 can be manipulated by a register allocated to a memory space that can be referred to from the CPU 201.

Figure 10:
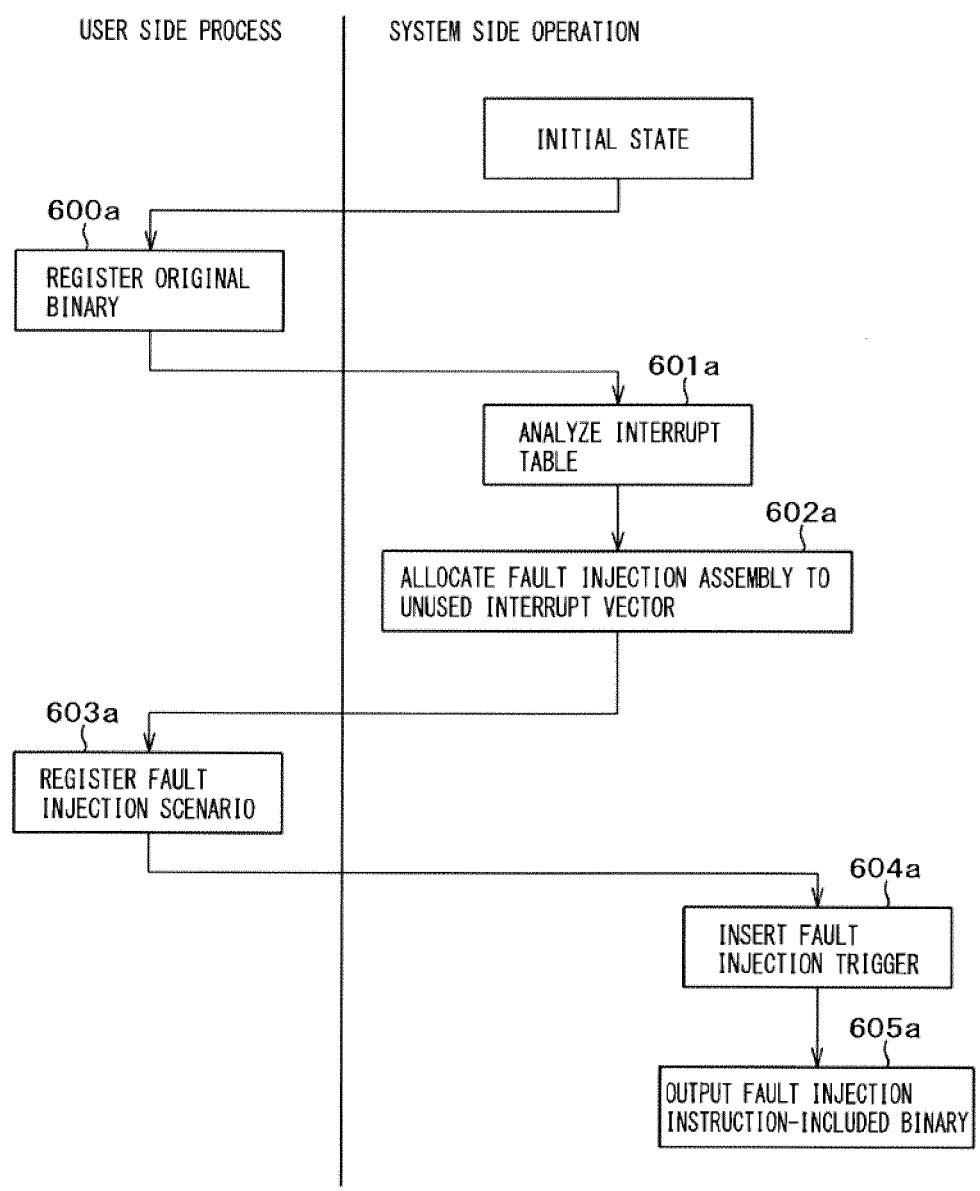
FIG. 10 is a diagram illustrating a fault injection binary generation flow according to the second embodiment.

FIG. 9 illustrates a configuration of the fault injection binary generating unit 110a used in the first embodiment, and FIG. 10 illustrates the flow of generating the fault injection instruction-included binary 109 through the fault injection binary generating unit 110a.

This part (110a) receives the two files, that is, the original binary file 500 and the fault injection assembly 502, and outputs the fault injection instruction-included binary 109a used in the fault injection simulation with reference to the fault injection scenario 510.

When the fault injection binary generating unit 110a starts an operation, first, the user is requested to register software that is desired to be verified, that is, the original binary 500 (step 600a).

The unused interrupt vector table extracting unit 501 analyses an interrupt table of the input original binary file 500, and extracts an interrupt vector to which a process is not allocated (step 601a).

The fault injection assembly embedding unit 503 combines one or more fault injection assemblies 502 with a bit operation equivalent to a fault mode desired by the user, and generates a fault injection interrupt process.

Further, the injection interrupt process is allocated to the unused interrupt vector extracted in step 601a (step 602a).

Then, the fault injection trigger embedding unit 504 receives the fault injection scenario 510 from the user (step 603a).

The fault injection scenario 510 stores a function name serving as a fault injection target and one in which two, that is, calling and ending of a function are selected as an occurrence time thereof.

Further, a function of triggering a fault injection interrupt embedded in the previous step (S602a) using a software interrupt is embedded in a function of software implemented by the user (step 604a).

This is finally written as the fault injection instruction-included binary 109a (step 0605a).

Figure 11:
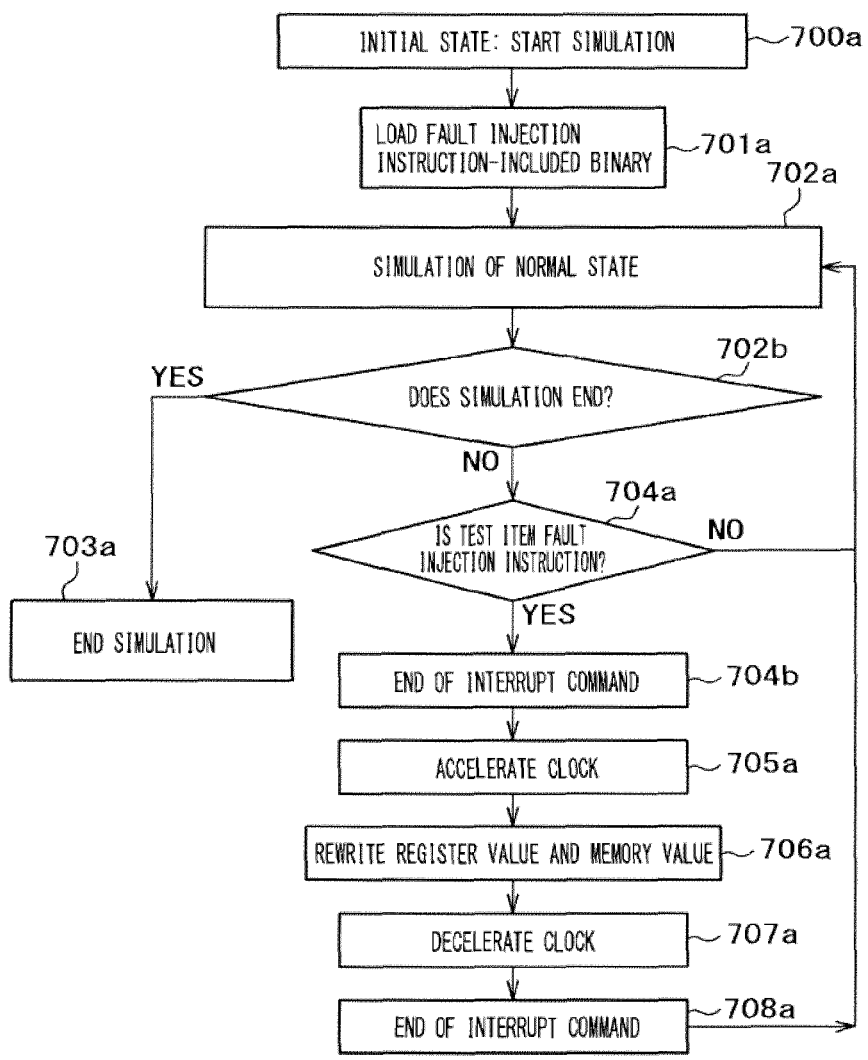
FIG. 11 is a diagram illustrating a system operation flow according to the second embodiment.

FIG. 11 illustrates an overall simulation execution flow according to the second embodiment of the present invention.

When the user selects the start of the simulation, the inside of the simulator starts a fault injection execution preparation (step 700a).

The simulator loads the fault injection instruction-included binary, and a software execution simulation starts on the simulator (step 701a).

Further, while the simulation of the normal state is continuously being performed (702a), when the simulation reaches the final state by a request from the user or a problem on the system (step 702b), the simulation ends (step 703a).

In the other cases, the simulation of the normal state is continued until the CPU executes the fault injection interrupt command (step 704a).

When the CPU triggers the fault injection interrupt command using the software interrupt command, the CPU bifurcates to the interrupt process for injecting the fault (step 704b).

A multiplication rate register of the clock generator 107 is accessed through a first command of the interrupt process, and the clock signal is accelerated. At this time, a value of a clock to be accelerated is set so that a sum of periods of time when the fault injection is executed is smaller than a period of one clock (a normal clock counter) (step 705a).

At this time, a register in the CPU or a special register of a PC, an SP, or the like is written in a memory through a context switch function of the CPU. On the other hand, an operation of rewriting a value selected in an interrupt handler is performed. Further, an operation of observing and rewriting the internal state of the microcontroller is performed by writing back the memory value in the register or the like using the context switch function of the interrupt (step 706a).

The multiplication rate register of the clock generator 107 is accessed through a command after the rewriting operation, the clock signal is decelerated (step 707a).

When the interrupt process ends, the CPU bifurcates to step 702a of the normal state, and the execution of the software is continued (step 708a).

REFERENCE SIGNS LIST

104: ROM
105: Fault injection executing unit
106: Microcontroller model
107: Clock generator
108: Bus controller
110: Fault injection binary generating unit
111: Simulator
112: Fault injection process-included binary
113: Fault injection instructing unit
201: CPU
203: Interrupt controller
204: Bus

The invention claimed is:

1. A microcontroller fault injection method of verifying an embedded system while performing a simulation using a computer, comprising:
   a first step of designating a register to which information related to a fault of a microcontroller of the embedded system is injected and an injection timing of the fault;
   a second step of applying an interrupt at the injection timing;
   a third step of rewriting a value of the designated register among register values output through the interrupt with a fault value; and
   a fourth step of writing back the register value rewritten with the fault value at the injection timing of the fault, and
   wherein a clock counter is accelerated when fault injection is executed during a period of time from the second step to the fourth step.

2. The microcontroller fault injection method according to claim 1,
   wherein acceleration of the clock counter during the period of time from the second step to the fourth step is set so that a sum of period of times when the fault injection is executed is smaller than a period of a normal clock counter.

3. The microcontroller fault injection method according to claim 1,
   wherein in the fourth step, an internal state of the microcontroller is rewritten by software installed on the microcontroller while a frequency of a clock signal related to the internal state of the microcontroller is being accelerated.

4. The microcontroller fault injection method according to claim 1,
   wherein a fault state is simulated by narrowing down an acceleration interval using a clock generator that performs clock acceleration or deceleration in synchronization with a start and an end of a software interrupt command.

5. The microcontroller fault injection method according to claim 1,
   wherein in the first step, a software interrupt command appropriate to insertion of a fault state desired by a user is inserted into a function calling or ending portion of software input by the user.

6. A microcontroller fault injection system that verifies an embedded system configured with a mechanism, hardware, and software, comprising:
   a first unit that designates a register to which information related to a fault of a microcontroller of the embedded system is injected and an injection timing of the fault;
   a second unit that applies an interrupt at the injection timing;
   a third unit that rewrites a value of the designated register among register values output through the interrupt with a fault value; and a fourth unit that writes back the register value rewritten with the fault value at the injection timing of the fault, and wherein a clock counter is accelerated during a period of time when fault injection is executed by the second unit to the fourth unit.

7. The microcontroller fault injection system according to claim 6, wherein acceleration of the clock counter when the fault injection is executed by the second to fourth units is set so that a sum of period of times when the fault injection is executed is smaller than a period of a normal clock counter.

* * * * *